US008055623B2

(12) United States Patent
Anglin et al.

(10) Patent No.: US 8,055,623 B2
(45) Date of Patent: *Nov. 8, 2011

(54) ARTICLE OF MANUFACTURE AND SYSTEM FOR MERGING METADATA ON FILES IN A BACKUP STORAGE

(75) Inventors: Matthew Joseph Anglin, Tucson, AZ (US); Ken Eugene Hannigan, Tucson, AZ (US); Mark Alan Hayes, Tucson, AZ (US); Avishai Haim Hochberg, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 448 days.

This patent is subject to a terminal disclaimer.

(21) Appl. No.: 12/264,856

(22) Filed: Nov. 4, 2008

(65) Prior Publication Data

US 2009/0063430 A1 Mar. 5, 2009

Related U.S. Application Data

(63) Continuation of application No. 11/292,716, filed on Dec. 1, 2005, now Pat. No. 7,483,927.

(51) Int. Cl.
*G06F 17/30* (2006.01)
(52) U.S. Cl. ........ 707/641; 707/707; 707/796; 707/808; 707/802; 707/803
(58) Field of Classification Search .................. 707/640, 707/641, 707, 737, 756, 791, 796, 802, 803, 707/808; 711/162
See application file for complete search history.

(56) References Cited

U.S. PATENT DOCUMENTS

| | | | |
|---|---|---|---|
| 6,397,308 B1 * | 5/2002 | Ofek et al. | 711/162 |
| 6,665,689 B2 * | 12/2003 | Muhlestein | 707/999.202 |
| 7,146,476 B2 | 12/2006 | Sandorfi et al. | |
| 7,483,927 B2 | 1/2009 | Anglin et al. | |
| 2003/0232318 A1 | 12/2003 | Altenhofen et al. | |
| 2004/0003003 A1 | 1/2004 | McCartney et al. | |
| 2005/0065912 A1 | 3/2005 | Cafrelli et al. | |
| 2005/0165735 A1 | 7/2005 | Lin et al. | |
| 2006/0294161 A1 | 12/2006 | Augenstein et al. | |

OTHER PUBLICATIONS

IBM Corporation, "Tivoli Storage Manager Version 3.7: Technical Guide", Copyright 1999, International Technical Support Organization, Dec. 1999, Chapters 1 and 3, pp. 1-22 and 43-96.

(Continued)

*Primary Examiner* — Cam-Linh Nguyen
(74) *Attorney, Agent, or Firm* — David W. Victor; Konrad Raynes and Victor LLP

(57) ABSTRACT

Provided are a system and article of manufacture for merging metadata on files in a backup storage. A query is received for information on files from a file system for a client node. A determination is made of metadata for files in a backup storage for the client node stored external to backup sets. At least one backup set in the backup storage for the client node is processed to determine metadata for files included in at least one backup set. The determined metadata for files in the backup storage and for files included in at least one backup set is merged to form merged metadata. The query is executed against the merged metadata to determine files whose metadata satisfies the query. Results including information from the merged metadata on the determined files are returned.

18 Claims, 5 Drawing Sheets

OTHER PUBLICATIONS

Office Action 1, Nov. 16, 2007, for U.S. Appl. No. 11/292,716, Total 9 pp.
Amendment 1, Feb. 18, 2008, for U.S. Appl. No. 11/292,716, Total 10 pp.
Office Action 2, Mar. 26, 2008, for U.S. Appl. No. 11/292,716, Total 7 pp.
Amendment 2, Jun. 26, 2008, for U.S. Appl. No. 11/292,716, Total 5 pp.
Notice of Allowance 1, Aug. 26, 2008, for U.S. Appl. No. 11/292,716, Total 6 pp.
Notice of Allowability, Dec. 15, 2008, for U.S. Appl. No. 11/292,716, Total 2 pp.

* cited by examiner

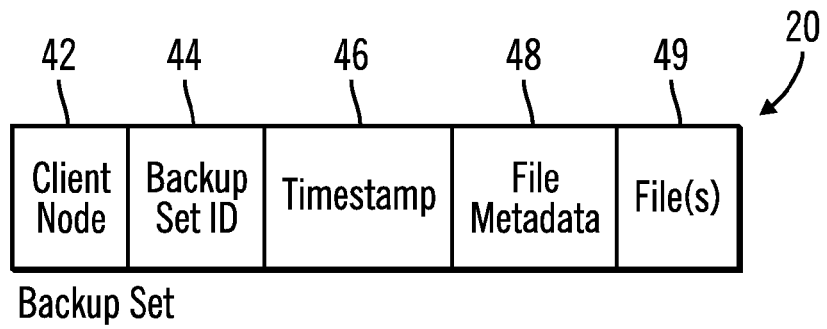
FIG. 2 Backup Set
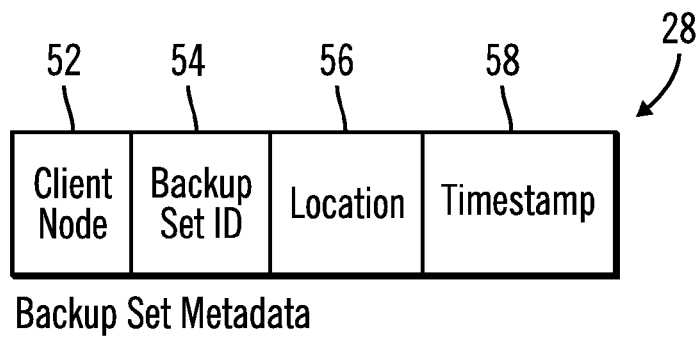
FIG. 3 Backup Set Metadata
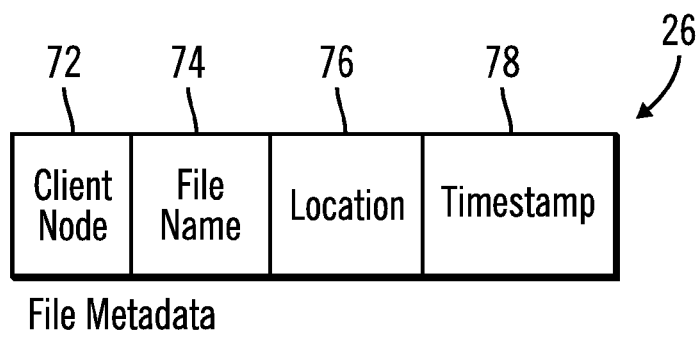
FIG. 4 File Metadata
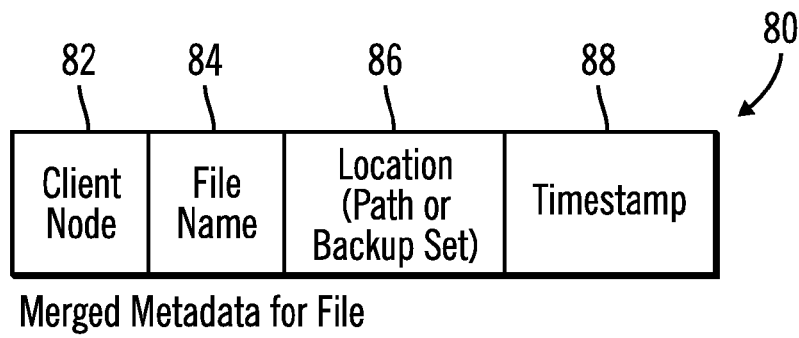
FIG. 5 Merged Metadata for File

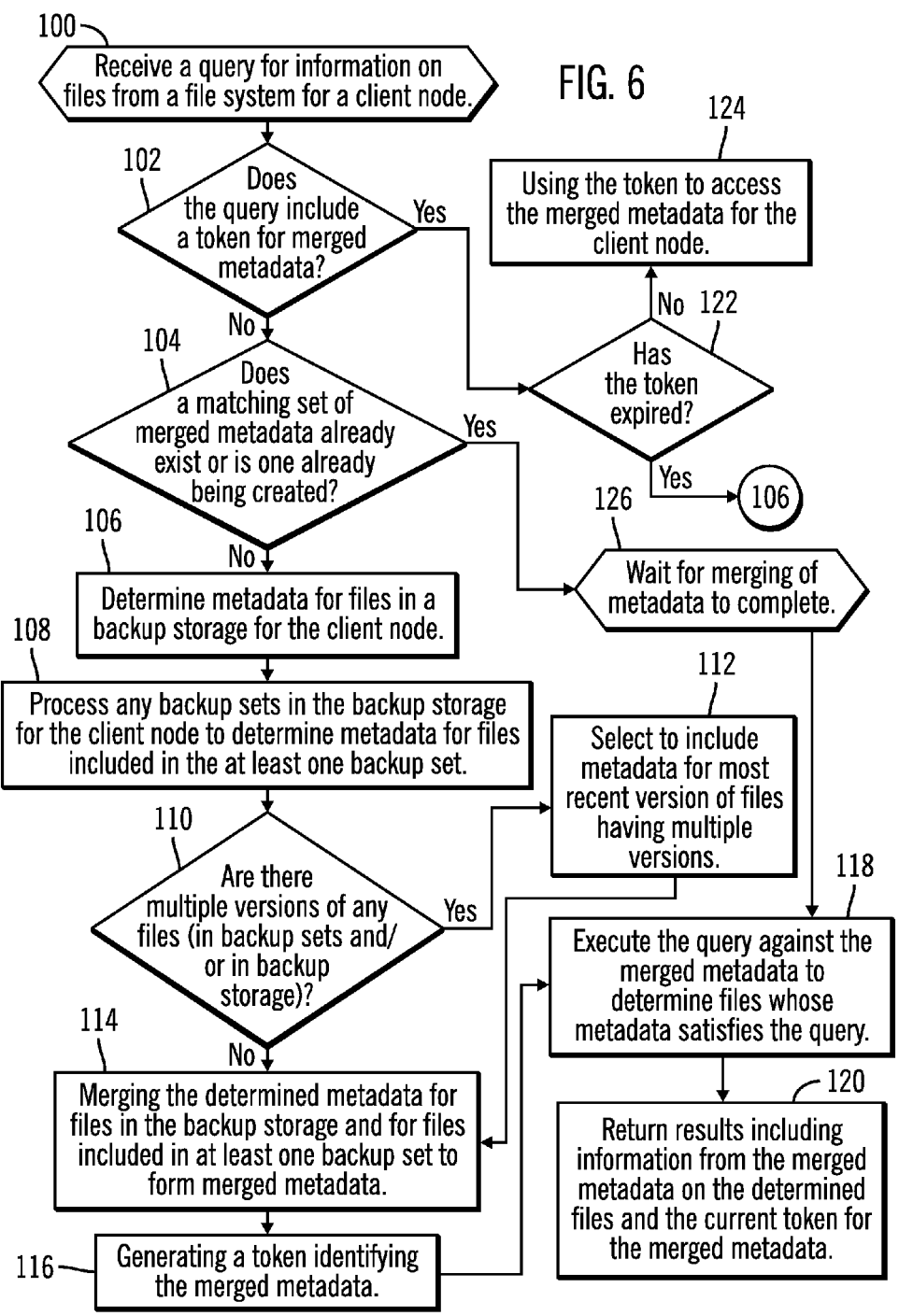

ARTICLE OF MANUFACTURE AND SYSTEM FOR MERGING METADATA ON FILES IN A BACKUP STORAGE

RELATED APPLICATION

This application is a continuation of U.S. patent application Ser. No. 11/292,716, filed on Dec. 1, 2005, which patent application is incorporated herein by reference in their entirety.

BACKGROUND OF THE INVENTION

1. Field of the Invention

The present invention relates to a article of manufacture and system for merging metadata on files in backup storage.

2. Description of the Related Art

In a network backup environment, a client system may backup data in a remote storage device over a network and coordinate the backup with a backup server. For instance, the International Business Machines ("IBM"®) Tivoli® Storage Manager product provides software for a client and server systems to backup client data. (IBM and Tivoli are registered trademarks of IBM). The client transfers files from its file system to the backup server. The backup server maintains a backup database having information on files sent to the backup server stored in a backup storage. The backup server may aggregate files into a backup set and add information on the backup set to the backup database.

The backup set may be stored on sequential media, such as a tape volume or sequential file volume. The backup set may comprise a point-in-time or snapshot backup of client files. The backup server forms a backup set by copying archived files for a client to a backup set object using the active backup files for the client. The backup set may be managed as one object, where the file structure remains within a backup set. Files included in a backup set may expire in the backup storage before a backup set including those same files expire.

To restore data from files at the backup server, the administrator of the client node may query the backup server for information on client files. To restore files from a backup set, the administrator at the client node must separately access and search the backup set for the files of interest and then restore the data from the backup set. Further, backup sets may be transferred to the client node to perform the restore operation from the backup set at the client site.

SUMMARY

Provided are a method, system, and program for merging metadata on files in a backup storage. A query is received for information on files from a file system for a client node. A determination is made of metadata for files in a backup storage for the client node stored external to backup sets. At least one backup set in the backup storage for the client node is processed to determine metadata for files included in at least one backup set. The determined metadata for files in the backup storage and for files included in at least one backup set is merged to form merged metadata. The query is executed against the merged metadata to determine files whose metadata satisfies the query. Results including information from the merged metadata on the determined files are returned.

BRIEF DESCRIPTION OF THE DRAWINGS

FIG. 2 illustrates an embodiment of a backup set.

FIG. 3 illustrates an embodiment of backup set metadata.

FIG. 4 illustrates an embodiment of file metadata.

FIG. 5 illustrates an embodiment of merged metadata for a file.

FIG. 6 illustrates an embodiment of operations performed by the backup server to query for backup files for a client node.

DETAILED DESCRIPTION

Figure 1:
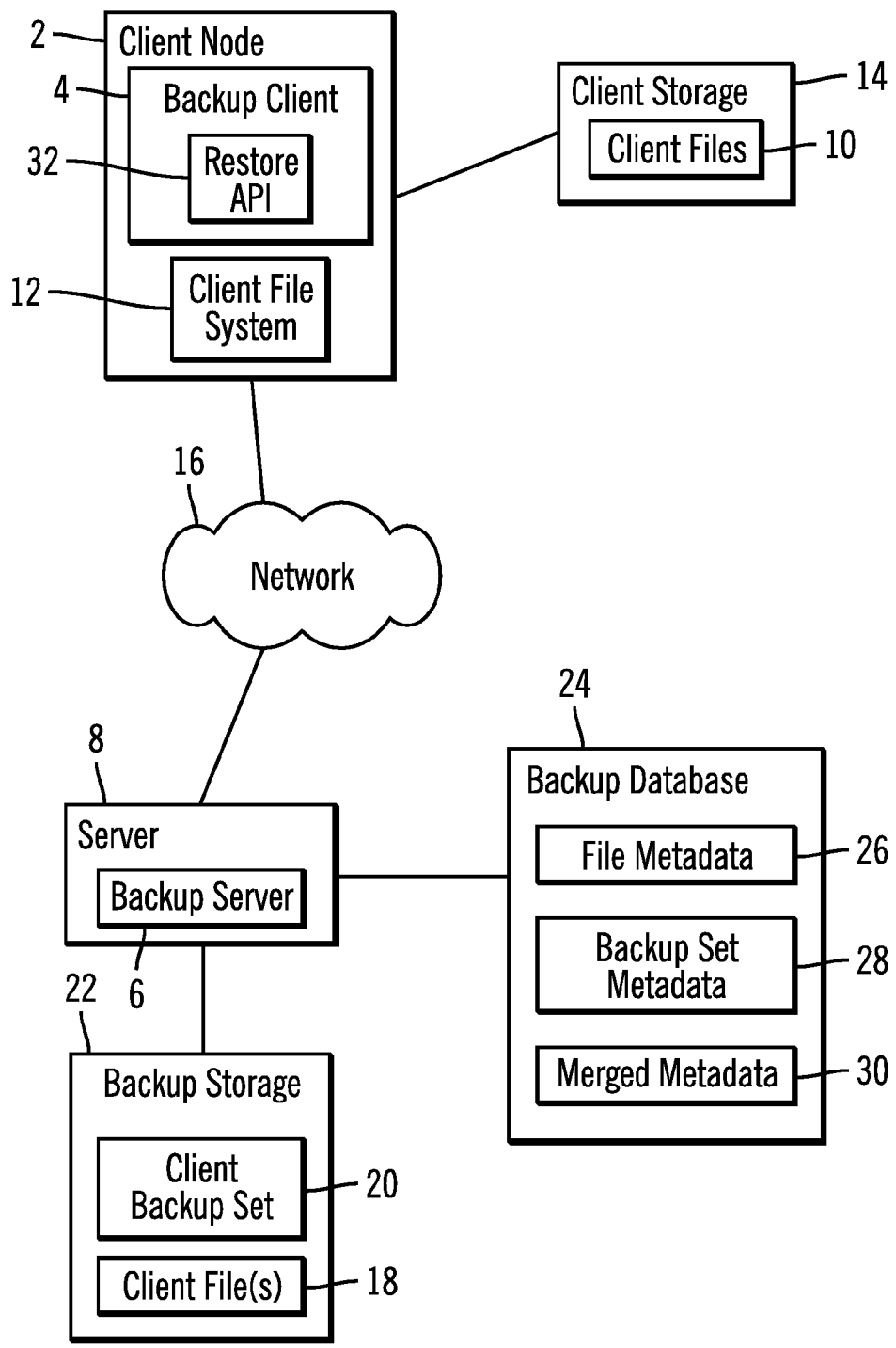
FIG. 1 illustrates an embodiment of a network computing environment.

FIG. 1 illustrates an embodiment of a network computing environment. A client node 2 comprises a computer system including a backup client 4 program that coordinates backup and archival operations with a backup server program 6 executed in a server 8 computer system. The backup client 4 may transfer client files 10 in the client file system 12 stored in a client storage 14 over a network 16 to the backup server 6. The backup server 6 archives client files 18 and backup sets 20 including client files in a backup storage 22. The backup server 6 stores in a backup database 24 file metadata 26 having information on client files 18 in the backup storage 22 that are stored separately in the backup storage 22 from any backup set, backup set metadata 28 having information on backup sets 20 in the backup storage 22, and merged metadata 30. There may be one instance or table of merged metadata 30 for each client node 2 in the network 16. There is one instance of file metadata 26 and backup set metadata 28 for each file and backup set, respectively, maintained for each client node.

The client nodes 2 that communicate with the backup server 6 may comprise suitable computational devices known in the art, such as servers, desktop computers, workstations, mainframes, hand held computing devices, telephony devices, etc. There may be multiple instances of the client node 2 having client storage 14. The client storage 14 may comprise a primary storage device used by a client 2, such as one or more hard disk drives. The remote backup storage 22 may comprise storage devices known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a tape library, an optical library, a network attached storage (NAS), etc. The network 16 may comprise a Wide Area Network (WAN), Local Area Network (LAN), Storage Area Network (SAN), wireless network, the Internet, an Intranet, peer-to-peer network, etc. The backup database 24 may comprise a relational database or other suitable database known in the art The backup client 4 and backup server 6 may comprise programs included with a client-server backup program, such as the IBM TSM backup manager or client-server backup programs offered by different computer vendors.

FIG. 2 illustrates an embodiment of an instance of one backup set 20 as including: client node information 42 identifying the client node whose files are included in the backup set 20; a backup set identifier (ID) 44; a timestamp 46 of the date and time the backup set was created (or most recent timestamp of files in the backup set); file metadata 48 having information on the files 49 included in the backup set 20. The file metadata 48 may comprise a text file, structured file (e.g., Extended Markup Language (XML) file, etc.), etc., including information on each file 49 in the backup set 20, such as a file name, location in the client file system 12, timestamp, etc. In this way, the file metadata 48 in a backup set 20 may be maintained in a different type of data structure, e.g., a text file, structure file, than the file metadata 26 for files not included in backup sets, where the file metadata 26 may be maintained as entries in one or more tables in the backup database 24. In an alternative embodiment, the file metadata 26 and 28 may be maintained in a same type of data structure. The merged metadata 30 may be included in the same type of data structure, e.g., a database table, including the file metadata 26.

FIG. 3 illustrates an embodiment of an instance of backup set metadata 28 maintained in the backup database 24 for each backup set 20 having information on the backup set 20, including: client node information 52 identifying the client node whose files are included in the backup set 20; a backup set identifier (ID) 54; a location 56 of the backup set in the backup storage 22; and a timestamp 58 of the date and time the backup set was created (or most recent timestamp of files in the backup set).

FIG. 4 illustrates an embodiment of an instance of file metadata 26 maintained in the backup database 24 having information on a client file 18 stored external to the backup sets. In this way, a client file 18 may be stored external in the backup storage 22 to any backup set and may also be stored simultaneously within a backup set. Further, a file stored separately in the backup storage 22 may be expired before the backup set including the expired file is expired. An instance of file metadata 26 may include: client node information 72 identifying the client node from which the file originated; a file name 74; a location 76 of the file 18 in the backup storage 22; and a timestamp 28 for the file.

FIG. 5 illustrates an embodiment of an instance of merged metadata 80 for one file in the merged metadata 30 for a client node 2 that is formed as described below from the file metadata 26 for a client node and the file metadata 48 in backup sets 20 for the client node. A merged metadata entry 80 may comprise a table in the backup database 24 and includes: client node information 82 identifying the client node from which the file originated; a file name 84; a location 86 of the file 18 in the backup storage 22, where the location may identify a path in the backup storage 22 or a backup set 20 in which the file is included; and a timestamp 28 for the file.

FIG. 6 illustrates an embodiment of operations performed by the backup server 6 to handle a query for files from the backup client 4, which may be initiated when the information on archived files from a file system 12 for a client node 2, the backup server 6 determines (at block 102) whether the query, e.g., restore API 32, includes a token for merged metadata 30. If not, then the backup server 6 determines (at block 104) whether a matching set of merged metadata already exists or one is already being created on files for the client node. If not, then the backup server 6 determines (at block 106) the metadata instances 26 for archived files 18 in the backup storage 22 for the client node 2. The backup server 6 further processes (at block 108) any backup sets 20 in the backup storage 22 for the client node to 2 determine metadata for files in the file metadata 48 for the backup sets 20 for the client node 2. The backup server 6 can process the backup database 24 to determine backup sets 20 for the client node 2 from the backup set metadata 28 (FIG. 3) whose client node information 52 matches the client node 2 submitting the query.

If (at block 110) there are multiple versions of any files (in backup sets and/or in backup storage), then metadata for the most recent version of files having multiple versions is selected (at block 112) to include in the merged metadata 80 being created, i.e., the file most recently added to the backup storage 22 or backup set 20. If (at block 110) there are no multiple versions of files or after selecting (at block 112) the most recent version of files having multiple versions, the backup server 6 merges (at block 114) the determined metadata for individual files in the backup storage 22, i.e., not included in any backup set, and for files included in one or more backup sets 20 into one merged metadata instance 80 for the query. In embodiments where the backup set file metadata 48 is in a different format, e.g., a text or structure file, than the format of the file metadata 26, e.g., a database table, then the backup server 6 may scan the file metadata 48 to determine information on the files in the backup set 20 for the client node and then create a merged metadata instance 80 in the merged metadata 30 table in the database 24 for each file in the processed backup set 28.

The backup server 6 generates (at block 116) a token identifying the merged metadata 30 for the client node 20 in the backup database 24. The query is executed (at block 118) against the merged metadata 30 to determine files whose metadata 80 satisfies the query. The backup server 6 returns (at block 120) results to the requesting client node 2 including information from the merged metadata 30 on the determined files that satisfy the query and the current token for the merged metadata 30.

If (at block 102) the query from the client node 2 includes a token for merged metadata 30, then the backup server 6 determines (at block 122) whether the token has expired. The token may expire if a predetermined time has elapsed since the token was created or since a last query from the client node 2 was received. If (at block 122) the token has not expired, then the backup server 6 uses (at block 124) the token to access the merged metadata 30 for the client node 2 and proceeds to block 112 to execute the query. If (at block 122) the token has expired, then control proceeds to block 104 et seq. to user an existing matching merged metadata 30 or to generate a new merged metadata 30 and new token for the client node 2.

With the described embodiments, the client node 2 submits subsequent queries to the backup server 6 using the token returned in response to the first query. If the backup server 6 generates and provides a new token for a recently refreshed merged metadata 30, then the backup client 4 uses that new token for further queries.

Figure 7:
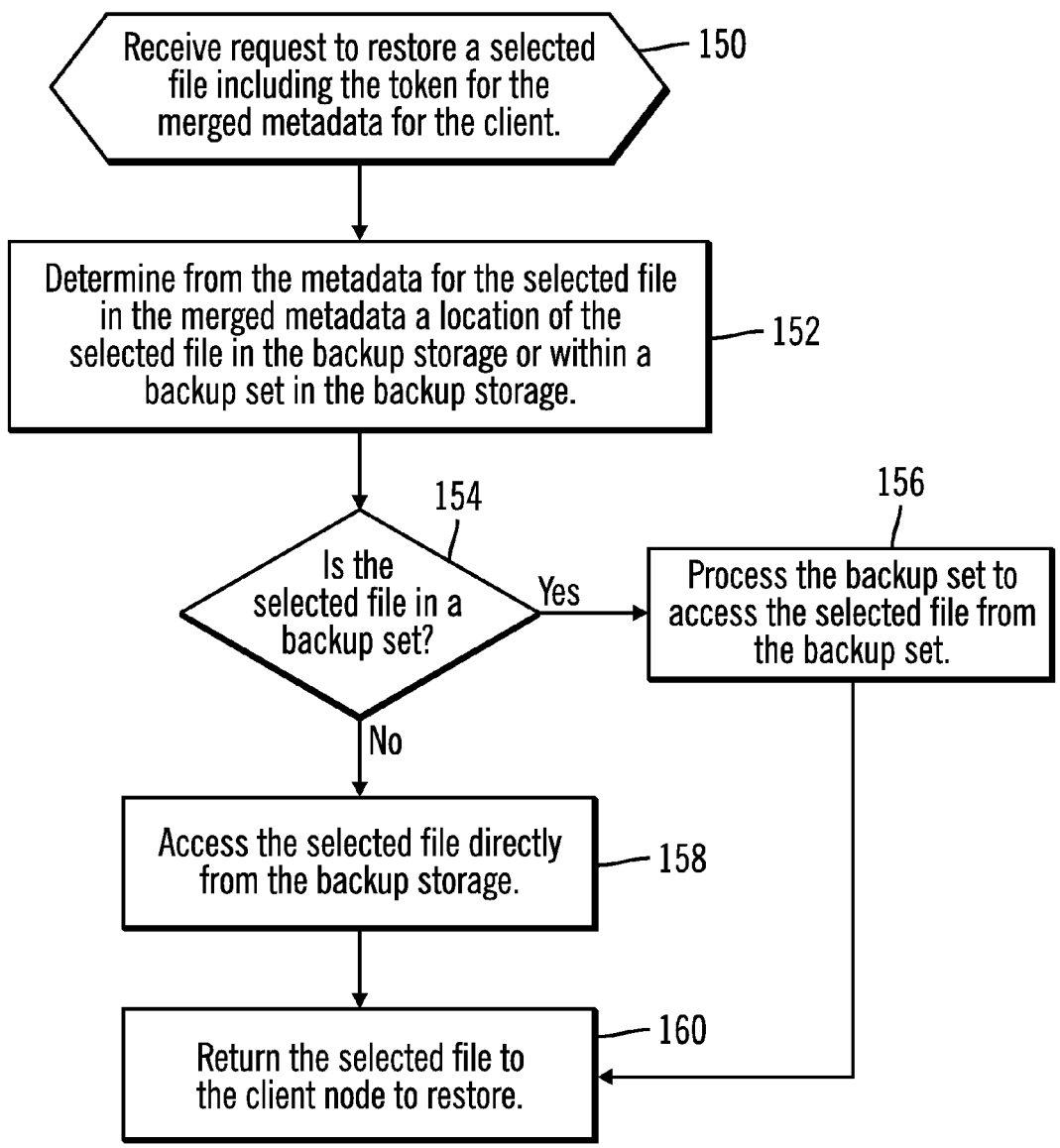
FIG. 7 illustrates an embodiment of operations performed by the backup server to return a selected file to the client node to restore.

FIG. 7 illustrates an embodiment of operations performed by the backup server 6 to process a restore request from a client node 2 submitted by the backup client 4, where the restore request may provide the token for the merged metadata 30 for the client node 2. Upon receiving (at block 150) a request to restore a selected file including the token for the merged metadata token for the client, the backup server 6 determines (at block 152) from the metadata 80 (FIG. 5) for the selected file in the merged metadata 30 a location 86 of the selected file in the backup storage 22 or within a backup set 20 in the backup storage 22. If (at block 154) the selected file to restore is within a backup set 20, then the backup server 6 processes (at block 156) the backup set 20 to access the selected file from the files 49 within the backup set 20. Otherwise, if the selected file is not within a backup set, then the backup server 6 accesses (at block 158) the selected file directly from the backup storage 22 from the indicated location 86 (FIG. 5). The accessed file (from block 156 or 158) is then returned (at block 160) to the client node 2 to restore to the client file system 12. This process may apply to a selection of one or more files to restore.

The described embodiments provide a technique to maintain merged metadata for files located individually in storage or included within backup sets, such that the queries may be executed against the merged metadata. The file metadata included in the merged metadata may be accessed from different types of data structures, e.g., relational databases, text files, etc., and consolidated in a common merged metadata data structure, e.g., table. With the described embodiments, the client may only provide a single query to access files whose metadata is maintained in different data structures and in different types of data structures.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 8:
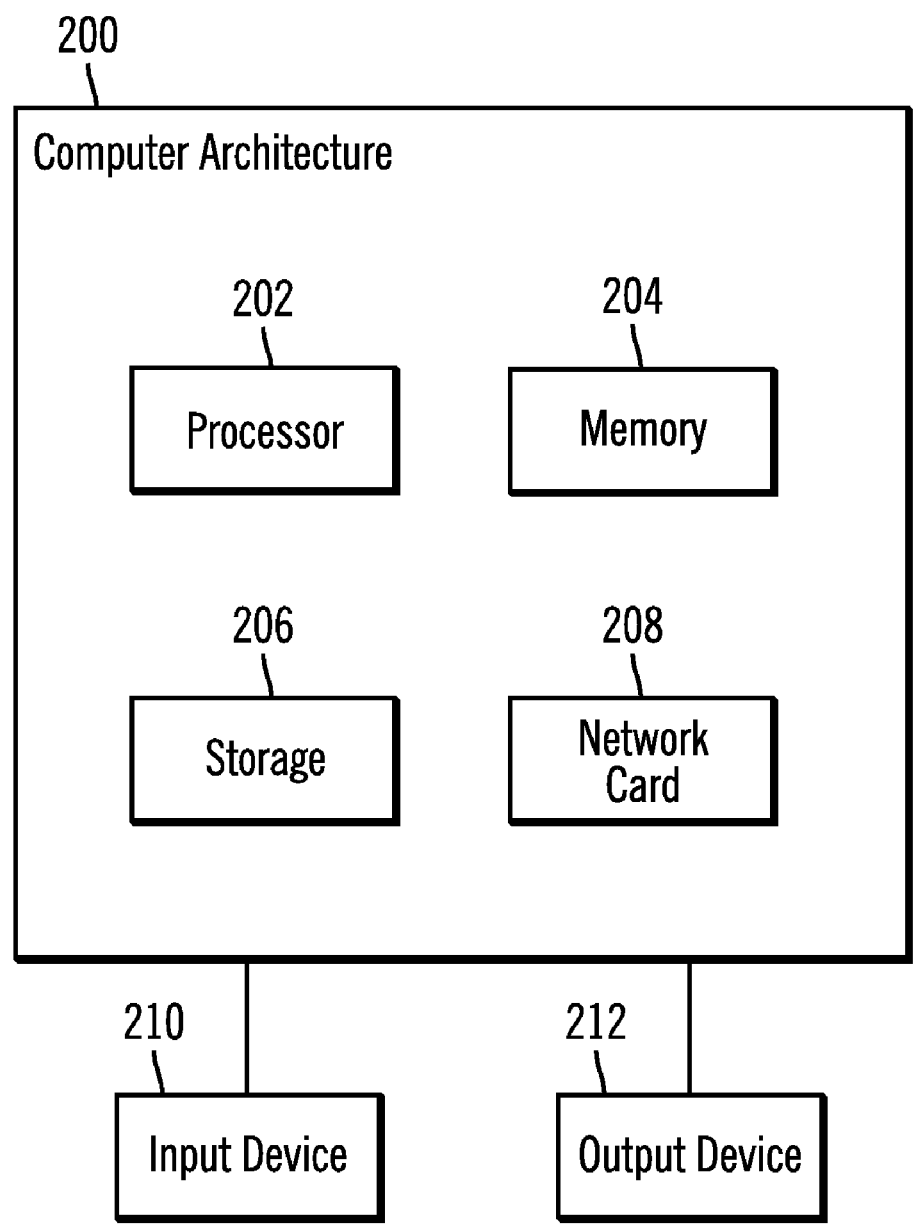
FIG. 8 illustrates an embodiment of a computer architecture.

FIG. 8 illustrates an embodiment of a computer architecture 200 that may be implemented at the client node 2 and server 8. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs, including an operating system and application programs, in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium including code executed to communicate with a client node over a network and a backup storage and to perform operations, the operations comprising:
   receiving a query for information on files from a file system for the client node;
   determining metadata for files in the backup storage for the client node stored external to backup sets;
   processing at least one backup set in the backup storage for the client node to determine metadata for files included in at least one backup set;
   merging the determined metadata for files in the backup storage and for files included in at least one backup set to form merged metadata;
   executing the query against the merged metadata to determine files whose metadata satisfies the query;
   returning results including information from the merged metadata on the determined files;
   generating a token identifying the merged metadata; and
   receiving a subsequent query with the token from the client node, wherein the token is used to execute the subsequent query against the merged metadata identified by the token.

2. The article of manufacture of claim 1, wherein the metadata for the files stored external to backup sets is included in a backup database, wherein the metadata for files in each backup set is included in the backup set, wherein the merged metadata is stored in a table in the database, and wherein the query is executed against the table in the database.

3. The article of manufacture of claim 2, wherein the metadata for the files in the backup database and the merged metadata are stored in a first type of data structure and wherein the metadata for files in the backup set is in a second type of data structure.

4. The article of manufacture of claim 1, wherein the operations further comprise:
   receiving a request to restore a selected file indicated in the returned results from the client node;
   determining from the merged metadata a location of the selected file in the backup storage or within a backup set in the backup storage;
   accessing the selected file from the determined location; and
   returning the accessed selected file to the client node.

5. The article of manufacture of claim 1, wherein the operations further comprise:
   returning the generated token to the client node, wherein the client node presents the token with subsequent queries for files for the client node.

6. The article of manufacture of claim 1, wherein the operations further comprise:
   determining whether the token received from the client node has expired; and
   in response to determining that the received token has expired, performing an additional instance of the operations of determining metadata for files in the backup storage for the client node, determining metadata for files included in the at least one backup set, and merging the determined metadata for files in the backup storage and for files included in at least one backup set to form merged metadata.

7. The article of manufacture of claim 6, wherein the operations further comprise:
   generating a new token for the merged metadata formed in response to determining that the received token expired; and
   returning the new token to the client node to use for subsequent queries for files for the client node.

8. The article of manufacture of claim 1, wherein the operations of receiving a query, determining metadata for files in the backup storage, processing at least one backup set in the backup storage to determine metadata for files included in the at least one backup set, and merging the determined metadata for files in the backup storage and for files included in at least one backup set to form merged metadata are performed for multiple client nodes, further comprising:
   maintaining multiple instances of merged metadata for client nodes.

9. The article of manufacture of claim 8, wherein the operations further comprise:
   determining whether there is a preexisting merged metadata having metadata for files for the client node; and
   returning results including information from the determined preexisting merged metadata on the determined files in response to determining that there is the preexisting merged metadata, wherein the operations of determining metadata for files in the backup storage, processing the at least one backup set, merging the determined metadata, and executing the query are performed in response to determining that there is no preexisting merged metadata for files for the client node.

10. A system in communication with a client node over a network, comprising:
    a processor;
    a backup storage including files and backup sets; and
    a computer readable medium including code executed by the processor to perform operations, the operations comprising:
       receiving a query for information on files from a file system for the client node;
       determining metadata for files in the backup storage for the client node stored external to backup sets;
       processing at least one backup set in the backup storage for the client node to determine metadata for files included in at least one backup set;
       merging the determined metadata for files in the backup storage and for files included in at least one backup set to form merged metadata;
       executing the query against the merged metadata to determine files whose metadata satisfies the query;
       returning results including information from the merged metadata on the determined files;
       generating a token identifying the merged metadata; and
       receiving a subsequent query with the token from the client node, wherein the token is used to execute the subsequent query against the merged metadata identified by the token.

11. The system of claim 10, wherein the metadata for the files stored external to backup sets is included in a backup database, wherein the metadata for files in each backup set is included in the backup set, wherein the merged metadata is stored in a table in the database, and wherein the query is executed against the table in the database.

12. The system of claim 11, wherein the metadata for the files in the backup database and the merged metadata are stored in a first type of data structure and wherein the metadata for files in the backup set is in a second type of data structure.

13. The system of claim 10, wherein the operations further comprise:
  receiving a request to restore a selected file indicated in the returned results from the client node;
  determining from the merged metadata a location of the selected file in the backup storage or within a backup set in the backup storage;
  accessing the selected file from the determined location; and
  returning the accessed selected file to the client node.

14. The system of claim 10, wherein the operations further comprise:
  returning the generated token to the client node, wherein the client node presents the token with subsequent queries for files for the client node.

15. The system of claim 10, wherein the operations further comprise:
  determining whether the token received from the client node has expired; and
  in response to determining that the received token has expired, performing an additional instance of the operations of determining metadata for files in the backup storage for the client node, determining metadata for files included in the at least one backup set, and merging the determined metadata for files in the backup storage and for files included in at least one backup set to form merged metadata.

16. The system of claim 15 wherein the operations further comprise:
  generating a new token for the merged metadata formed in response to determining that the received token expired; and
  returning the new token to the client node to use for subsequent queries for files for the client node.

17. The system of claim 10, wherein the operations of receiving a query, determining metadata for files in the backup storage, processing at least one backup set in the backup storage to determine metadata for files included in the at least one backup set, and merging the determined metadata for files in the backup storage and for files included in at least one backup set to form merged metadata are performed for multiple client nodes, wherein the operations further comprise:
  maintaining multiple instances of merged metadata for client nodes.

18. The system of claim 17, wherein the operations further comprise:
  determining whether there is a preexisting merged metadata having metadata for files for the client node; and
  returning results including information from the determined preexisting merged metadata on the determined files in response to determining that there is the preexisting merged metadata, wherein the operations of determining metadata for files in the backup storage, processing the at least one backup set, merging the determined metadata, and executing the query are performed in response to determining that there is no preexisting merged metadata for files for the client node.

\* \* \* \* \*